United States Patent
Aktir et al.

(10) Patent No.: US 12,286,892 B2
(45) Date of Patent: Apr. 29, 2025

(54) TURBOFAN PROVIDED WITH A FASTENING ASSEMBLY ARRANGED ON A FAN CASING

(71) Applicant: SAFRAN AIRCRAFT ENGINES, Paris (FR)

(72) Inventors: Yasser Aktir, Moissy-Cramayel (FR); Charles Cailliez-Tomasi, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/288,987

(22) PCT Filed: Apr. 28, 2022

(86) PCT No.: PCT/FR2022/050822
§ 371 (c)(1),
(2) Date: Oct. 30, 2023

(87) PCT Pub. No.: WO2022/234221
PCT Pub. Date: Nov. 10, 2022

(65) Prior Publication Data
US 2024/0218810 A1    Jul. 4, 2024

(30) Foreign Application Priority Data
May 7, 2021  (FR) ...................................... 2104853

(51) Int. Cl.
*F01D 25/24*    (2006.01)
(52) U.S. Cl.
CPC ........ *F01D 25/243* (2013.01); *F05D 2220/36* (2013.01); *F05D 2260/85* (2013.01)

(58) Field of Classification Search
CPC . F01D 25/243; F05D 2220/36; F05D 2260/85
See application file for complete search history.

(56) References Cited

U.S. PATENT DOCUMENTS 5,249,417 A * 10/1993 Duesler ................ F01D 25/285
                                                              248/596
6,896,038 B2 * 5/2005 Arilla ...................... F01D 25/12
                                                              165/47

(Continued)

FOREIGN PATENT DOCUMENTS

FR    3031341 A1 * 7/2016 ............. B64D 33/02
FR    3077846 A1    8/2019

(Continued)

OTHER PUBLICATIONS

International Patent Application No. PCT/FR2022/050822, International Search Report dated Aug. 30, 2022 with English translation, 7 pages.

*Primary Examiner* — Jesse S Bogue
(74) *Attorney, Agent, or Firm* — Cozen O'Connor

(57) ABSTRACT

A turbofan including a fan, at least one annular casing surrounding the fan and elements being fastened to an outer surface of the casing via a fastening assembly, the elements including a first elastic member arranged for urging the first end of the support away from the casing, and a first return member (27) arranged for resiliently urging the first end towards the casing, and a second elastic member (25) arranged for urging the second end of the support away from the casing, and a second return member (29) arranged for resiliently urging the second end towards the casing.

7 Claims, 3 Drawing Sheets

(56) References Cited

U.S. PATENT DOCUMENTS

| | | | | |
|---|---|---|---|---|
| 7,010,906 B2* | 3/2006 | Cazenave | ............ | C22C 32/0073 |
| | | | | 244/129.1 |
| 7,845,159 B2* | 12/2010 | Venkataramani | ......... | F02C 7/14 |
| | | | | 60/39.08 |
| 8,366,039 B2* | 2/2013 | Porte | ...................... | B64D 27/18 |
| | | | | 244/54 |
| 8,510,945 B2* | 8/2013 | Hand | ...................... | F02K 3/115 |
| | | | | 60/730 |
| 8,894,349 B2* | 11/2014 | Harper | ................. | F01D 21/045 |
| | | | | 415/214.1 |
| 9,534,507 B2* | 1/2017 | Sauerhoefer | ......... | F01D 25/243 |
| 9,934,885 B2* | 4/2018 | Broughton | ................ | F02C 7/32 |
| 10,006,369 B2* | 6/2018 | Kupiszewski | ............ | F28D 7/10 |
| 10,393,147 B2* | 8/2019 | Dreischarf | ............ | F04D 19/002 |
| 10,690,267 B2* | 6/2020 | Pisacreta | ................. | F01D 25/28 |
| 10,995,633 B2* | 5/2021 | Kusakabe | ............. | F01D 21/045 |
| 11,143,105 B2* | 10/2021 | Luschek | ................... | F02C 7/18 |
| 11,248,526 B2* | 2/2022 | Tajiri | ........................ | F28F 7/02 |
| 11,572,928 B2* | 2/2023 | Duesler | ..................... | F28F 9/24 |
| 2007/0001062 A1* | 1/2007 | Kirby | .................... | F16L 23/006 |
| | | | | 248/65 |
| 2008/0095611 A1* | 4/2008 | Storage | ................... | F28F 1/022 |
| | | | | 415/116 |
| 2011/0076132 A1* | 3/2011 | Bottome | ................ | F01D 25/26 |
| | | | | 415/9 |
| 2013/0051981 A1* | 2/2013 | Hindle | ...................... | F01D 5/10 |
| | | | | 415/119 |
| 2014/0208770 A1* | 7/2014 | Fitt | ...................... | F16B 41/002 |
| | | | | 411/103 |
| 2017/0314471 A1* | 11/2017 | Sennoun | ................. | F28D 15/02 |
| 2019/0226357 A1* | 7/2019 | Beauquin | .................. | F01D 9/06 |
| 2020/0018427 A1* | 1/2020 | Pisacreta | ............... | B60R 16/0215 |
| 2020/0208537 A1* | 7/2020 | Kusakabe | ............... | F01D 25/24 |
| 2021/0388762 A1* | 12/2021 | Mercier | .................... | F02K 3/06 |

FOREIGN PATENT DOCUMENTS

| | | | | |
|---|---|---|---|---|
| FR | | 3081533 A1 * | 11/2019 | ............ B65D 63/04 |
| FR | | 3082227 A1 | 12/2019 | |
| FR | | 3093539 A1 | 9/2020 | |
| WO | WO 2014137411 A1 | | 9/2014 | |
| WO | WO 2021028307 A1 | | 2/2021 | |

* cited by examiner

TURBOFAN PROVIDED WITH A FASTENING ASSEMBLY ARRANGED ON A FAN CASING

CROSS-REFERENCE TO RELATED APPLICATIONS

This application is a US National phase Application of International Patent Application No. PCT/FR2022/050822 filed Apr. 28, 2022, which claims priority to FR No. 2104853 filed May 7, 2021, titled "Turbofan Provided with a Fastening Assembly Arranged on a Fan Casing," both of which are hereby incorporated in their entireties.

TECHNICAL FIELD OF THE INVENTION

The invention relates to a turbofan, in particular one intended to equip an aircraft.

PRIOR ART

FIG. 1 illustrates a turbofan 1 of the prior art, intended to equip an aircraft, in particular an airplane. Turbofan 1 extends along an axis X and comprises, from upstream to downstream in the direction of gas circulation, a fan 2, a low-pressure compressor 3, a high-pressure compressor 4, a combustion chamber 5, a high-pressure turbine 6, and a low-pressure turbine 7. Low and high-pressure compressors 3, 4, combustion chamber 5, and high and low pressure turbines 6, 7 are located in what is referred to as a primary airstream 8. What is referred to as a secondary airstream 9 extends around primary airstream 8, downstream of fan 2.

The terms axial, radial, and circumferential are defined in relation to the X axis of the turbomachine. The terms upstream and downstream are defined in relation to the direction of gas circulation within the turbomachine.

Fan 2 is arranged in an annular casing 11, called a fan casing, fan 2 comprising a plurality of blades. In the event of a fan blade breaking, it may be ejected radially outwards under the effect of centrifugal forces, striking the fan casing and being retained by it. The fan casing thus allows trapping the ejected portion of the blade in order to prevent it from damaging another part of turbofan 1. The area of the fan in which such ejection of a blade portion can occur forms an impact cone extending circumferentially outward from the hub of fan 2.

As illustrated in FIG. 2, casing 11 has a radially outer surface 13 which can receive a plurality of elements 15, 17, for example hydraulic pipes and/or electrical harnesses. These elements 15, 17 are fastened to casing 11 by supports 19 extending axially and comprising a first end 31 and a second end 33 which are respectively fastened to an upstream flange and to a downstream area of the fan casing. The first and second ends are arranged so that they are located outside said impact cone, to avoid accidental loss of the support in the event that a portion of a fan blade is ejected.

Each support 19 in particular has a general bridge shape. This bridge shape makes it possible in particular to reduce the risk of damage to elements fastened to the supports, in the event that a portion of a fan blade is ejected.

Elements 15, 17 fastened to support 19 in particular comprise hydraulic lines 17 which convey pressurized fluids as well as a starter air duct 15 (or SAD) which supplies pressurized air to a starter system called an air-start system, via a starter air valve (or SAV).

During operation, hydraulic lines 17 are likely to transmit vibrations generated by a hydraulic pump, these vibrations being transmitted to the starter air duct 15 via supports 19, which can cause premature damage to the starter air valve, particularly in the event of resonance between the frequencies generated by the pump and the mode of vibration of said starter air valve.

Presentation of the Invention

The invention aims to remedy these disadvantages in a simple, reliable, and inexpensive manner.

To this end, the invention relates to a turbofan comprising a fan, at least one annular casing surrounding said fan, elements being fastened to an outer surface of the casing via a fastening assembly comprising:
- at least one support extending substantially parallel to an axial direction of the turbofan, each support comprising a first end and a second end which are spaced axially apart from each other,
- a plurality of attachment members, each attachment member ensuring the fastening of one of the elements to the support, characterized in that the fastening assembly further comprises:
- a first elastic member arranged for urging the first end of the support away from the casing, and a first return member arranged for resiliently urging the first end towards the casing, and
- a second elastic member arranged for urging the second end of the support away from the casing, and a second return member arranged for resiliently urging the second end towards the casing.

The elastic members and the return members make it possible, by deformation, to dampen the vibrations in the support during operation. This helps attenuate the vibrations transmitted through the support and propagated along the starter air duct, thereby increasing the service life of the starter air valve.

The elastic members and the return members are deformable in the radial direction in particular.

The first and second ends can thus be movable in the radial direction around a position of equilibrium in which the radial forces exerted by the elastic members and the return members compensate for each other.

The first elastic member and/or the second elastic member can be compression springs respectively arranged between the outer surface of the casing and the first end or second end of the support.

Such elastic members have attractive mechanical and thermal resistance properties, suitable for the environment of a turbofan.

The compression springs can for example be coil springs.

Each first and second elastic member can have a stiffness which allows good attenuation of the amplitude of the vibrations transmitted by the support.

The support may comprise receiving sleeves projecting from the first end or the second end toward the outer surface of the casing, each sleeve receiving a portion of the first elastic member or second elastic member.

This characteristic allows the elastic members to be held in place effectively and lastingly.

The sleeves may have an annular shape.

Alternatively, the support may comprise housings in which at least a portion of the elastic members is received.

Each sleeve may have a length that is less than half of the length at rest of the corresponding elastic member.

Recall that an elastic spring is deformable between a compressed position, in which a force is exerted along the compression axis of the spring, and a rest position, in which no force is exerted.

This feature makes it possible to avoid any contact between the sleeve and the outer surface of the casing.

The first return member and the second return member may each comprise at least one tongue, said tongue comprising a first end fastened to the support and a second end fastened to the casing, to the flange, or to an intermediate support fastened to the flange.

This type of return member has good mechanical strength and good thermal resistance, which is suitable for the environment of a turbofan.

The first return member and/or the second return member may comprise at least two tongues stacked one on top of the other and fastened to one another at their respective ends.

This feature makes it possible to adapt the stiffness of the return members in a simple manner without having to design and manufacture new parts.

Each return member can have a bending stiffness in the radial direction which makes it possible to dampen the vibration level at the starter air duct.

Such stiffness values allow good attenuation of the amplitude of the vibrations transmitted by the support.

The elements may include hydraulic pipes for carrying a pressurized liquid, for example oil or a fire-resistant hydraulic fluid, and/or a compressed-air starter air duct for the turbofan, connected to a pneumatic starter air valve.

The invention may also relate to an aircraft comprising a turbofan of the aforementioned type.

Said aircraft may be an airplane.

DETAILED DESCRIPTION OF THE INVENTION

Figure 1:
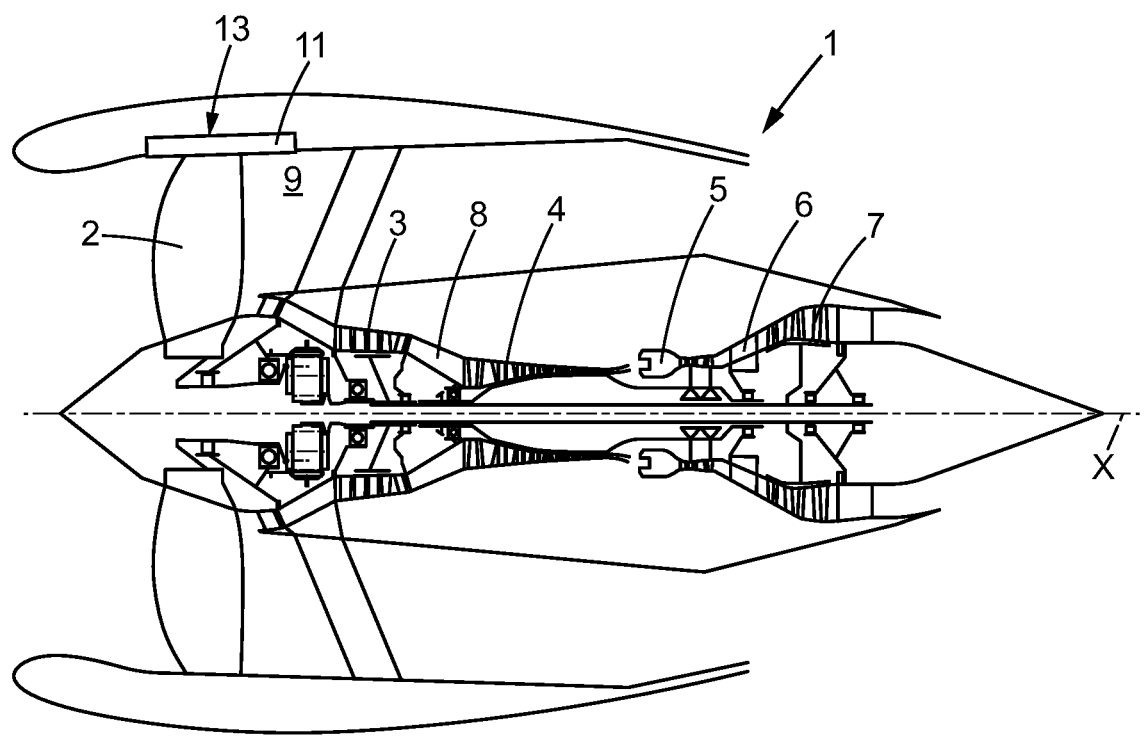
FIG. 1 is a partial longitudinal section view of a turbofan of the prior art.
Figure 2:
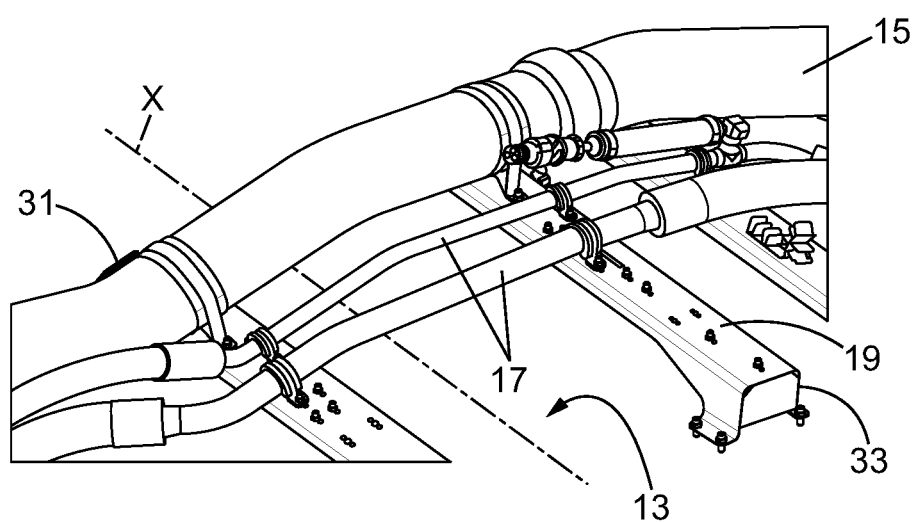
FIG. 2 is a perspective view of a fan casing of the turbofan of FIG. 1, to which are fastened the supports for elements mounted on the casing.
Figure 3:
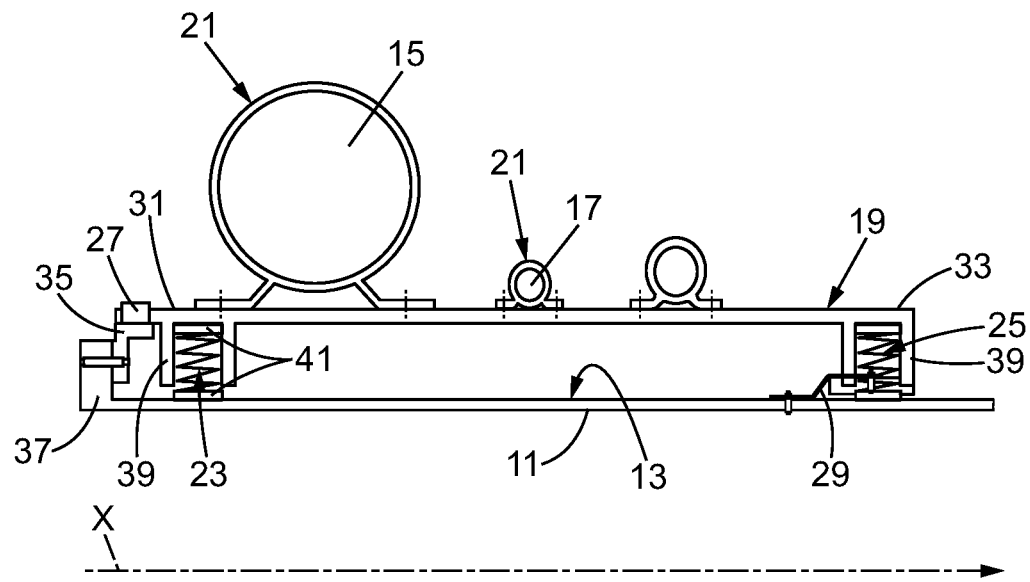
FIG. 3 is a schematic section view of a support assembly according to the invention.
Figure 4:
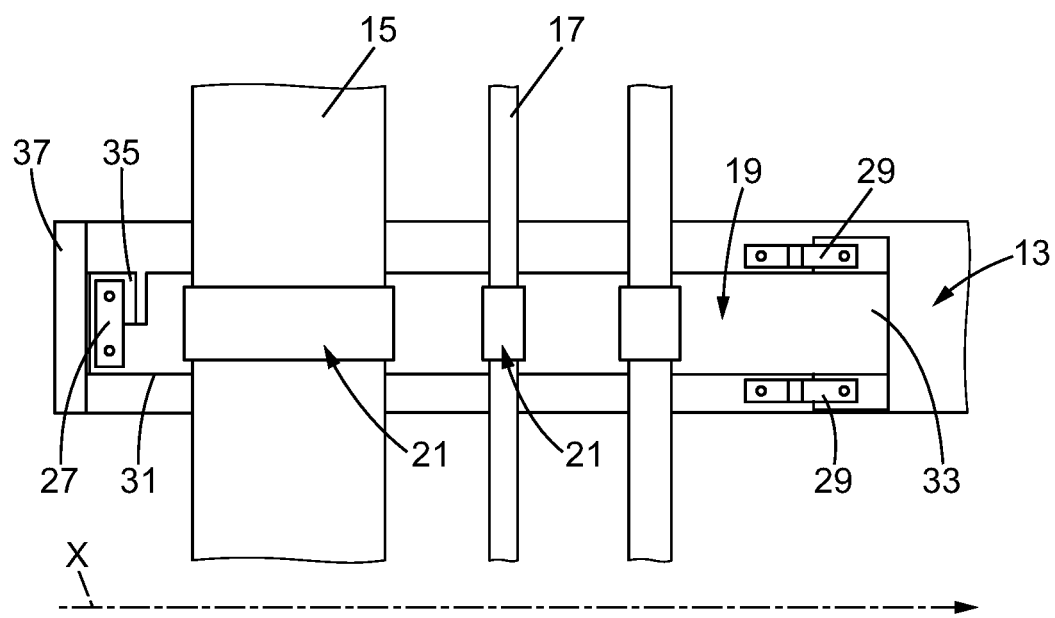
FIG. 4 is a schematic top view of the support assembly of FIG. 3.

FIGS. 3 and 4 illustrate part of a turbofan 1 according to the invention. This differs from the prior art turbofans presented above, in the features described below.

Turbofan 1 comprises a fan 2 and an annular casing 11 surrounding fan 2, casing 11 defining an outer surface 13 receiving a fastening assembly for fastening a plurality of elements 15, 17.

Elements 15, 17 fastened by the support assembly comprise in particular at least one starter air duct 15 and hydraulic lines 17.

Hydraulic lines 17 are pipes intended to convey pressurized fluids such as a fire-resistant hydraulic fluid (for example those marketed under the "Skydrol" brand), or oil. They are likely to transmit vibrations generated by a hydraulic pump during operation.

Starter air duct 15 supplies a turbofan start system with pressurized air, via a starter air valve (not shown).

The starter air valve is sensitive to vibrations transmitted along starter air duct 15, particularly in the event of resonance between the frequencies generated by the hydraulic pump and the mode of vibration of said starter air valve.

The fastening assembly comprises at least one support 19, a plurality of attachment members 21, as well as a first elastic member 23, a second elastic member 25, a first return member 27, and second return members 29.

Support 19 is oriented axially and comprises a first end 31 and a second end 33 which are spaced axially apart from one another.

Attachment members 21 ensure the fastening of elements 15, 17 to support 19.

Attachment members 21 are for example omega-shaped clamps surrounding elements 15, 17 and fastened to support 19 at their ends, by rivets or bolts.

First elastic member 23 is arranged to urge first end 31 of support 19 away from casing 11.

First elastic member 23 is able to exert a radially oriented elastic return force on support 19, of an intensity proportional to the deformation applied to first elastic member 23 from a rest position in which first elastic member 23 is not subject to any external force.

For example, first elastic member 23 is a compression spring, arranged to be compressed radially between support 19, in proximity to first end 31, and outer surface 13 of casing 11.

First elastic member 23 has a compressive stiffness which allows effective damping of the vibrations of support 19.

Second elastic member 25 is arranged to urge second end 33 of support 19 away from casing 11.

Second elastic member 25 is able to exert a radially oriented elastic return force on support 19, of an intensity proportional to the deformation applied to second elastic member 25 from a rest position in which second elastic member 25 is not subject to any external force.

For example, second elastic member 25 is a compression spring, arranged to be compressed radially between support 19, in proximity to second end 33, and outer surface 13 of casing 11.

Second elastic member 25 has a compressive stiffness which allows effective damping of the vibrations of support 19.

The support comprises sleeves 39 for receiving elastic members 23, 25, these sleeves projecting from first end 31 or second end 33 towards outer surface 13 of casing 11, each sleeve 39 receiving a portion of first elastic member 23 or of second elastic member 25.

Sleeves 39 have an annular shape around a radially oriented axis, and their open end is facing outer surface 13 of casing 11.

Sleeves 39 make it possible to hold elastic members 23, 25 in place in the axial and circumferential directions and to guide them in the radial direction, during the operation of turbofan 1.

Elastomer plates 41 may be arranged around the ends of elastic members 23, 25, and/or elastic members 23, 25 may be lubricated, in order to reduce friction against support 19, outer surface 13 of casing 11, and sleeves 39.

Each sleeve 39 has for example a length equal to half the length at rest of elastic member 23, 25 received in said sleeve 39. The length at rest of elastic member 23, 25 is its length when no compressive force is applied to it along its compression axis.

This prevents sleeve 39 from coming into contact with outer surface 13 of casing 11 during normal operation.

First return member 27 and second return member 29 are arranged to exert elastic return forces respectively on first and second ends 31, 33 of support 19, in order to urge them radially in the direction of outer surface 13 of casing 11.

First return member 27 is fastened to first end 31 of support 19 on the one hand, and to an intermediate support 35 on the other hand, which itself is fastened to an end flange 37 of casing 11 which extends along an upstream edge of outer surface 13 of casing 11.

Alternatively, first return member 27 can be fastened to first end 31 on the one hand, and on the other hand directly to flange 37 or directly to outer surface 13 of casing 11.

First return member 27 is for example oriented circumferentially, while first end 31 of support 19 comprises a recessed portion through which the return member extends.

Second return members 29 are fastened to second end 33 of support 19 on the one hand, and to outer surface 13 of casing 11 on the other hand.

For example, second return members 29 are oriented axially, and fastened circumferentially to both sides of second end 33 of support 19.

First return member 27 and/or each second return member 29 comprises for example a metal tongue having two ends, by which it is fastened via at least one rivet and/or at least one bolt.

Each metal tongue has a bending stiffness in the radial direction between its two ends which allows effective damping of the vibrations of support 19.

Alternatively, first return member 27 and/or each second return member 29 each comprise several metal tongues stacked one on top of the other and fastened to one another at their respective ends.

Elastic members 23, 25 and return members 27, 29 exert radial forces in opposite directions on ends 31, 33 of support 19, such that support 19 is able to oscillate around a position of equilibrium in which said radial forces exerted on each of its ends 31, 33 compensate for each other.

The oscillations of support 19 make it possible to take up and absorb part of the vibrations originating from certain elements 15, 17 and to reduce their propagation to other elements 15, 17.

The turbofan support assembly according to the invention allows reducing the transmission of vibrations between the supported elements, by absorbing part of these vibrations via the deformations of elastic members 23, 25 and return members 27, 29.

The invention claimed is:

1. A turbofan (1) comprising:
    a fan (2),
    at least one annular casing (11) surrounding said fan (2), and
    elements (15, 17) being fastened on an outer surface (13) of the casing (11) via a fastening assembly comprising:
        at least one support (19) extending substantially parallel to an axial direction (X) of the turbofan, each support (19) comprising a first end (31) and a second end (33) which are spaced axially apart from each other,
        a plurality of attachment members (21), each attachment member (21) ensuring the fastening of one of the elements (15, 17) to the support (19),
    characterized in that the fastening assembly further comprises:
        a first elastic member (23) arranged for urging the first end (31) of the support (19) away from the casing (11), and a first return member (27) arranged for resiliently urging the first end (31) towards the casing (11), and
        a second elastic member (25) arranged for urging the second end (33) of the support (19) away from the casing (11), and a second return member (29) arranged for resiliently urging the second end (33) towards the casing (11); wherein the elements (15, 17) comprise hydraulic pipes (17) for carrying a pressurized liquid, and/or a compressed-air starter air duct (15) for the turbofan (1), connected to a pneumatic starter air valve.

2. The turbofan (1) according to claim 1, wherein the first elastic member (23) and/or the second elastic member (25) are compression springs respectively arranged between the outer surface (13) of the casing (11) and the first end (31) or second end (33) of the support (19).

3. The turbofan (1) according to claim 1, wherein the support (19) comprises receiving sleeves (39) projecting from the first end (31) or the second end (33) toward the outer surface (13) of the casing (11), each sleeve (39) receiving a portion of the first elastic member (23) or second elastic member (25).

4. The turbofan (1) according to claim 3, wherein each sleeve (39) has a length that is less than half of the length at rest of the corresponding elastic member (25, 27).

5. The turbofan (1) according to claim 1, wherein the first return member (27) and the second return member (29) each comprise at least one tongue, said tongue comprising a first end fastened to the support (19) and a second end fastened to the outer surface (13) of the casing (11), to a flange (37) of the casing (11), or to an intermediate support (35) fastened to said flange (37).

6. The turbofan (1) according to claim 5, wherein the first return member (27) and/or the second return member (29) comprise at least two tongues stacked one on top of the other and fastened to one another at their respective ends.

7. An aircraft comprising the turbofan (1) according to claim 1.

* * * * *